United States Patent [19]

Weber et al.

[11] Patent Number: 5,568,959

[45] Date of Patent: Oct. 29, 1996

[54] VEHICLE SEAT WITH INTEGRATED BOOSTER SEAT AND WITH INTERCHANGEABLE MODULES

[75] Inventors: James L. Weber, West Bloomfield; Vasile Nae, Troy, both of Mich.

[73] Assignee: Hoover Universal, Inc., Plymouth, Mich.

[21] Appl. No.: 412,134

[22] Filed: Mar. 28, 1995

[51] Int. Cl.$^6$ ............................. A47C 15/00; A47D 11/00
[52] U.S. Cl. .............................................. 297/238; 297/255
[58] Field of Search .............................. 297/14, 238, 255, 297/256; 108/33, 38

[56] References Cited

U.S. PATENT DOCUMENTS

| | | | |
|---|---|---|---|
| 4,756,573 | 7/1988 | Simin et al. | 297/238 |
| 4,900,086 | 2/1990 | Steward | 297/238 |
| 4,913,487 | 4/1990 | Breckel et al. | 297/14 |
| 5,205,608 | 4/1993 | Stig | 297/14 |
| 5,312,156 | 5/1994 | Heussner et al. | 297/238 |
| 5,328,233 | 7/1994 | Maule | 297/238 |

*Primary Examiner*—Peter M. Cuomo
*Assistant Examiner*—Anthony D. Barfield
*Attorney, Agent, or Firm*—Harness, Dickey & Pierce, P.L.C.

[57] ABSTRACT

A vehicle seat having an integrated booster seat in which a child booster seat cushion is disposed within a cavity in the seat back and is rotatable to a forward extending use position spaced above the seat cushion providing a raised booster seat cushion for a child to elevate the child to a position in which an adult restraint system can be used with the child. The seat back has a movable panel which covers the cavity in the seat back in which the booster seat cushion is stored. Once the booster seat cushion has been moved to its use position, the panel is returned to its closed position whereby the panel forms the seat back surface for both an adult and a child. The booster seat can be provided in a form of a removable module which can be removed from the seat back and replaced with another module containing unique features such as an integral child seat or an armrest module.

10 Claims, 3 Drawing Sheets

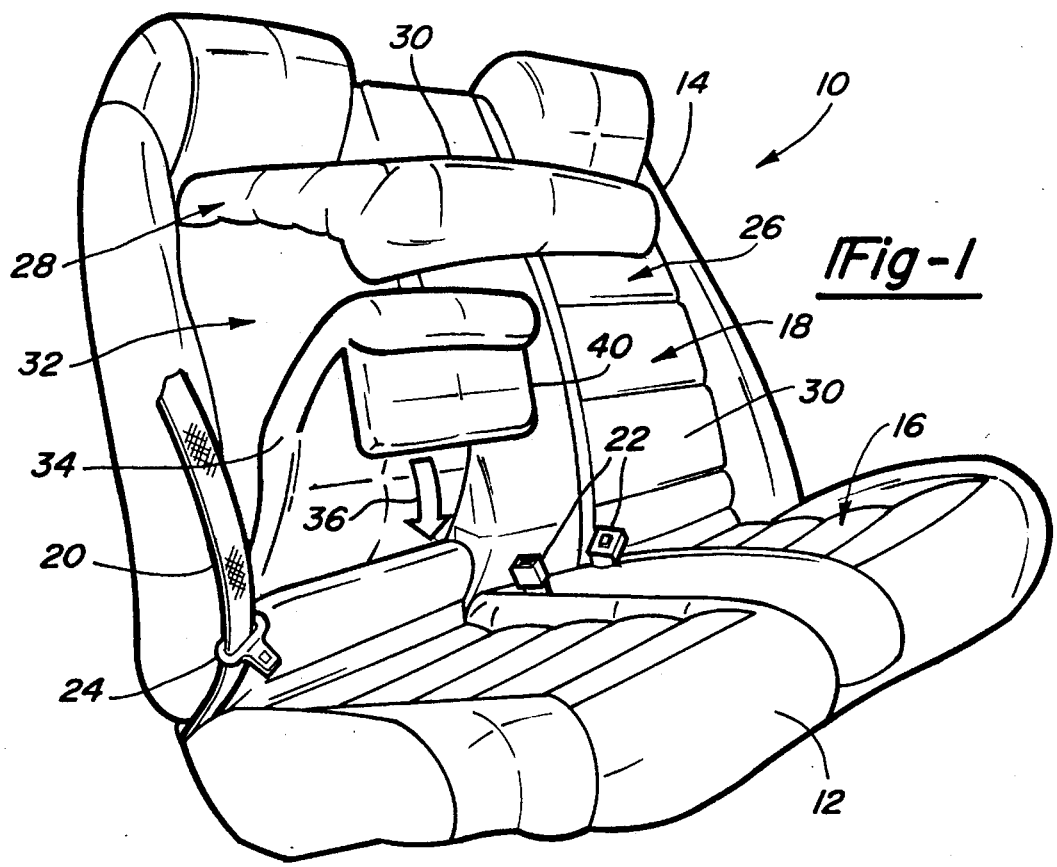
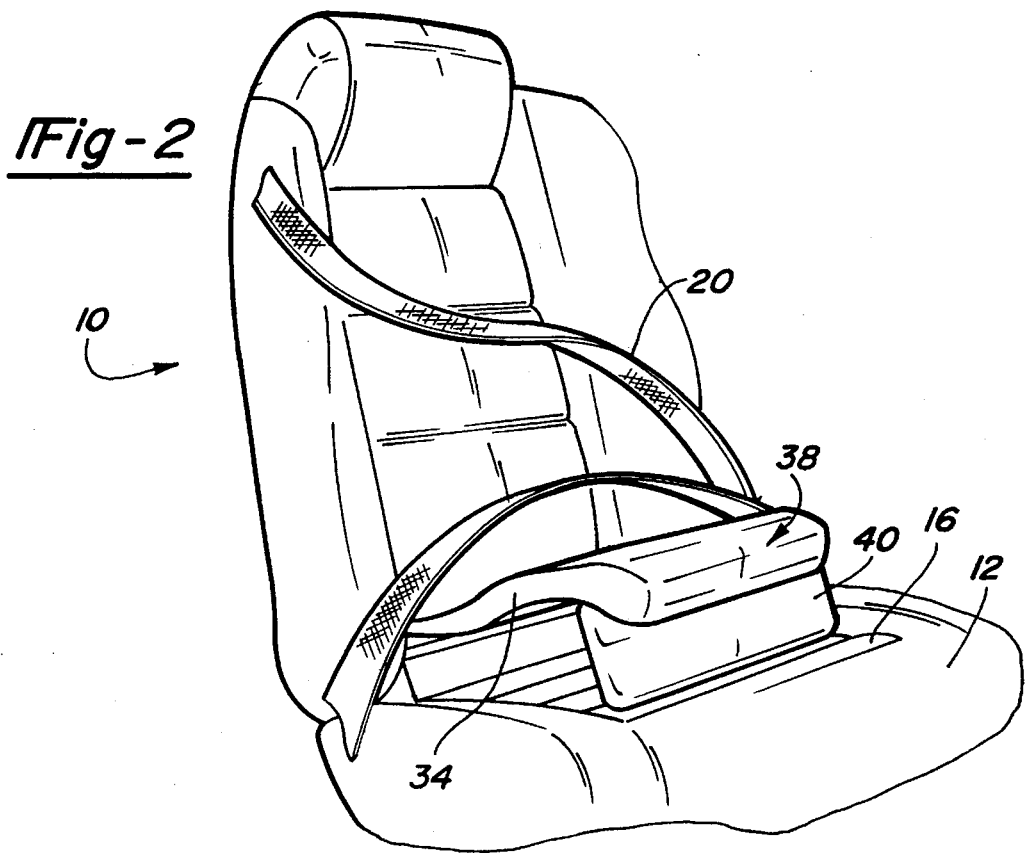

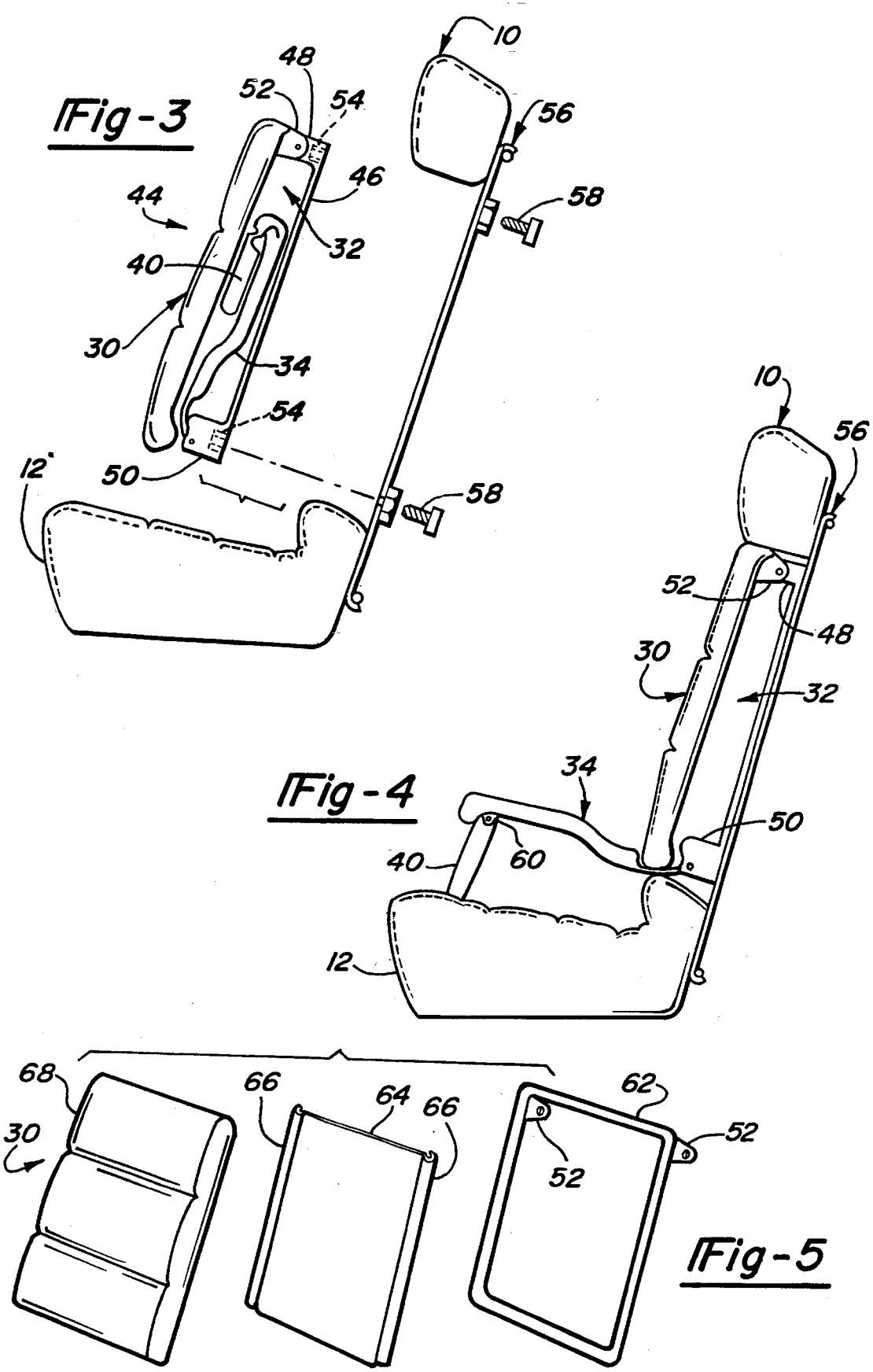

VEHICLE SEAT WITH INTEGRATED BOOSTER SEAT AND WITH INTERCHANGEABLE MODULES

BACKGROUND AND SUMMARY OF THE INVENTION

The present invention relates to a vehicle seat having an integrated booster seat and also to a vehicle seat which has interchangeable seat modules, each containing unique features for the seat such as the booster seat, a child seat, an armrest, etc.

Vehicle seats having a child seat contained therein, commonly referred to as an integrated child seat, have been growing in popularity in recent years. An increasing number of vehicles are available with an integrated child seat option. However, the integrated child seat is only useful during a short portion of a child's life between birth and the time a child is able to sit on the adult seating surfaces and use the adult restraining belts. After a child outgrows an integrated child seat, a booster seat is necessary to raise the child above the adult seat cushion surface to an elevated position in which the child is at a proper height for use of the adult shoulder belt restraint. This necessitates a purchase of an add-on booster seat which does not offer the conveniences and options which were previously available with the integrated child seat. Accordingly, it is one object of the present invention to provide an integrated booster seat for a vehicle seat assembly.

Since a vehicle owner will typically own a vehicle over a greater length of time than a child will be using the integrated child seat, it is a further object of the present invention to provide a seat with interchangeable modules, each containing various seating features. For example, an integrated child seat module can be installed in the vehicle seat for use with a small child. After the integrated child seat is outgrown, the child seat module is replaced with the booster seat module. After the booster seat is outgrown, it can be replaced with yet another module, such as an armrest module containing an armrest for use by adult passengers. The use of interchangeable seat modules provides greater flexibility and utility to the vehicle seat assembly.

The booster seat of the present invention is described below in the context of a booster seat module, but is not limited to use solely within a module. The booster seat can be a permanently installed feature of a vehicle seat assembly. The booster seat module has a frame which is removably attached to the seat back frame with bolts or other easily removable fasteners. A seat back panel is attached to the module frame and is moveable between a closed position and an open position. In the closed position, the seat back panel forms a portion of the seat back surface of the seat assembly. In its open position, a recess in the seat back is revealed. A booster seat cushion is stowed within this recess seat back. The booster seat panel is movable from its stowed position in the recess to a use position in which it extends forward of the seat back and is spaced above the seat cushion of the seat assembly. The booster seat cushion provides a child seating surface which is thus spaced above the adult seating surface of the seat cushion. Once the booster seat panel is placed in its use position, the seat back panel is returned to the closed position, covering the recess in the seat back and forming a seat back surface for use by a booster seat occupant. The booster seat cushion raises a child seated thereon to an appropriate height for use of an adult shoulder belt restraint provided with either the vehicle seat or the vehicle itself.

In its broadest sense, the invention pertains to a vehicle seat comprising a lower seat cushion having an upper seating surface upon which an adult seat occupant sits. The seat further includes a seat back extending upwardly from the rear end of the lower seat cushion and having an adult seat back surface upon which an adult seat occupant rests. The adult seat back has a seat back panel which is movable between open and closed positions, and which forms a portion of the adult seat back surface when it is in the closed position. The seat back panel, when in the open position, reveals a recess in the seat back. A child booster seat cushion has a stowed position within the recess in the seat back and is movable, when the seat back panel is in its open position, to a use position extending forward from the seat back and spaced vertically above the upper seating surface of the lower seat cushion, whereby a child can sit upon the child booster seat cushion and be positioned at a higher elevation than if the child was seated upon the lower seat cushion. The seat back panel is movable back to its closed position after the child booster seat has been moved to its use position, whereby the seat back panel forms a back surface for both child and adult occupants of the seat assembly.

Further objects, features and advantages of the invention will become apparent from a consideration of the following description and the appended claims when taken in connection with the accompanying drawings.

BRIEF DESCRIPTION OF THE DRAWINGS

FIG. 1 is a perspective view of a seat assembly containing two booster seats of the present invention illustrating one in a stowed position and one in the process of being moved from its stowed position to its use position;

FIG. 2 is a perspective view similar to FIG. 1 illustrating the booster seat in its use position;

FIG. 3 is a fragmentary side elevational view of the seat assembly illustrating the booster seat module separate from the seat frame;

FIG. 4 is a sectional view of the seat assembly similar to FIG. 3 illustrating the booster seat deployed;

FIG. 5 is an exploded perspective view illustrating the structure of the movable seat back panel.

DETAILED DESCRIPTION OF THE PREFERRED EMBODIMENT

Figure 6:
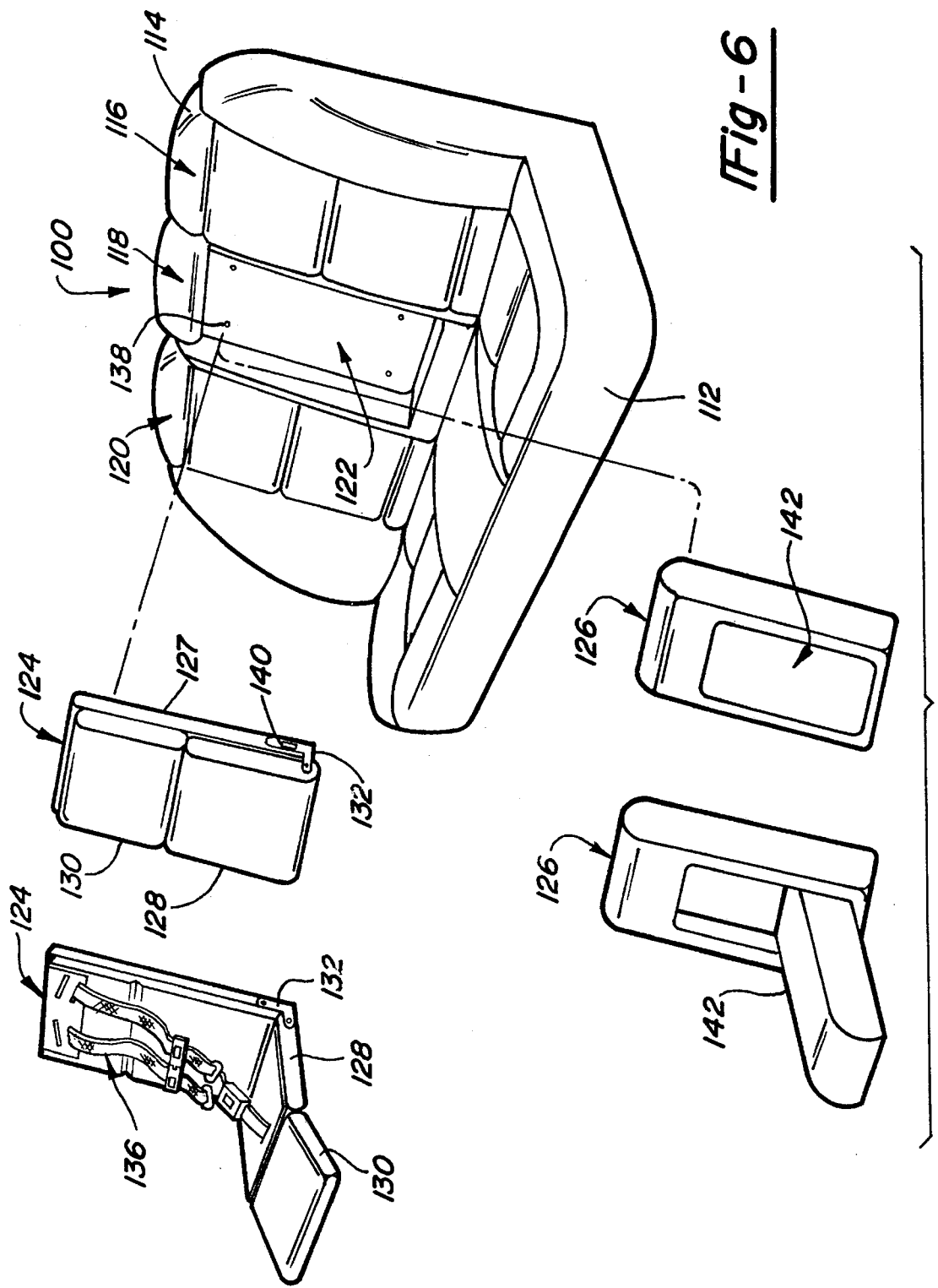
FIG. 6 is an exploded perspective view illustrating multiple interchangeable seat modules.

A seat assembly 10 is shown in FIG. 1 which includes a pair of booster seat modules according to the present invention. The seat assembly 10 includes a lower generally horizontal seat cushion 12, and a seat back 14 which extends upwardly at the rear of the seat cushion. The seat cushion 12 has an upper seating surface 16 upon which an adult seat occupant sits. The seat back, in turn, has a forward facing seat back surface 18 upon which a seat occupant rests when seated in the seat assembly 10. The seat assembly 10, as shown, includes two seating positions. However, the invention is not limited to a seat assembly having two seating positions.

Associated with the seat assembly is a passenger restraint system. The passenger restraint system includes a restraint belt 20 along the sides of the vehicle seat assembly and a pair of buckles 22 at the center of the seat assembly. The belt 20 carries a sliding clasp 24 which, when the belt 20 is drawn across the torso and lap of the occupant, can be inserted into the buckle 22. When the clasp 24 is inserted into the buckle 22, the belt 20 forms both a shoulder belt and a lap belt to restrain a seat occupant. The restraining belt 20 is installed in the vehicle in such a manner to be at the appropriate position to properly restrain an adult seated upon the seat assembly 10. However, for a small child to utilize the restraint belt 20, the child must be positioned above the seat cushion 12 so that the belt 20 crosses the child's shoulder and upper torso at an appropriate position to provide the desired protection.

In order to place a child at a proper height, the seat 10 includes a pair of booster seat modules 26, 28. The booster seat module 26 is shown with the booster seat stowed, enabling use of the seat at that position by an adult. The booster seat module 28, on the other hand, is shown in the process of being deployed for use of the booster seat by a child.

The booster seat modules 26, 28, each includes a seat back panel 30 which has a closed position in which it forms a part of the seat back surface 18. The seat back panel 30 is movable to an open position, as shown with the module 28, in which it is raised upwardly and forwardly by rotation about its upper end. Once the seat back panel is opened, a recess 32 is revealed in the seat back. A movable booster seat cushion 34 is stowed within the recess 32. With the seat back panel in its open position, the booster seat cushion 34 can be rotated forwardly and downwardly, as shown in FIG. 1 by the arrow 36. When the booster seat cushion is moved to its use position, shown in FIG. 2, it extends generally forwardly from the seat back and has an upper booster seat surface 38 which is spaced above the upper surface 16 of the seat cushion 12.

The booster seat cushion 34 includes a support leg 40 at its distal end which is rotatably mounted and extends downwardly for contact with the seat cushion 12. Once the booster seat cushion 34 has been rotated to its use position, the seat back panel 30 is once again returned to its closed position, as shown in FIG. 2. The seat back panel 30 is used by both a child seat occupant and an adult seat occupant. With a child seated upon the booster seat surface 38, the child is now positioned appropriately for use of the restraint belt 20.

In reference to FIG. 3, a booster seat module 44 is shown separate from the remainder of the seat assembly 10. The booster seat module 44 includes the seat back panel 30, booster seat cushion 34 and support leg 40. Also included in the module 44 is a frame 46 to which the seat back panel 30 and booster seat cushion 34 are attached. The frame 46 includes a panel 47 that forms the back wall of the recess 32. The module frame 46 includes, at its upper end, a pair of mounting flanges 48 (only one of which is shown), and at its lower end, another pair of mounting flanges 50 (only one of which is shown). The seat back panel 30 has a pair of rearwardly extending mounting flanges 52 which are pivotally connected to the upper mounting flanges 48 of the frame 46. Likewise, the booster seat cushion 34 is pivotally attached to the lower mounting flanges 50 to mount the booster seat cushion.

The module frame 46 also carries weld nuts 54 which enable attachment of the booster seat module 44 to the frame 56 of the seat assembly 10. Bolts 58 extend forward through the frame 56 and are threaded into the weld nuts 54 to attach the module to the seat frame 56. The releasable nut and bolt attachment of the module 44 enables the booster seat module to be interchanged with other seat modules such as an integral child seat module, etc., as will be described below. The recess 32 previously described behind the seat back panel 30, is formed between the seat back panel 30 and the panel 47 of the frame 46. This recess houses the booster seat cushion and its support leg when not in use.

With reference to FIG. 4, the booster seat is shown in a deployed use position with the booster seat cushion 34 extending forwardly, above the seat cushion 12. The booster seat cushion 34 is formed with a stiff pan having a foam pad positioned thereon. The foam pad and pan are covered with an upholstery material. The pan includes a pair of downwardly extending mounting flanges 60 near its distal end (front end when in use). A support leg 40 is pivotally attached to the flange 60. When the booster seat is in use, the support leg 40 extends downwardly, generally normal to the booster seat cushion 34, and engages the upper surface of the seat cushion 12. In the stowed position of the booster seat, shown in FIG. 3, the support leg 40 is pivoted to a position generally parallel to the booster seat cushion 34, so that both the cushion and support leg can be stowed within the recess 32. The booster seat cushion 34, at its proximal end, is constructed only of the stiff pan covered with the upholstery material excluding the foam pad. This forms a thin mounting portion 35 adjacent the attachment of the cushion 34 to the mounting flanges 50. The mounting portion 35 is positioned between the seat back panel 30 and the seat cushion 12 at the lower end of the recess 32. The reduced thickness of the mounting portion 35 enables the seat back panel 30 to be returned to its upright position, as shown in FIG. 4 with the booster seat deployed.

With reference to FIG. 5, the seat back panel 30 is shown in an exploded perspective view. The seat back panel includes a wire frame 62 which includes the mounting flanges 52. An elastic suspension mat 64 is stretched across the frame and attached by extruded J-clip fasteners 66 along the edges of the suspension mat. A foam pad 68 is placed over the suspension mat and the entire assembly is covered by a durable trim cover. The wire frame and suspension mat structure for the seat back panel produces a thin, yet comfortable, panel for the seat back.

The concept of interchangeable modules for the seat back, each providing unique features, is shown and described with reference to FIG. 6. In FIG. 6 a seat assembly 100 is shown having a seat cushion 112 and a seat back 114. The seat 100 has three seating positions: a left-hand position 116, a center position 118 and a right-hand position 120. Any of the three seating positions can be designed to accommodate interchangeable seat modules. The seat 100 is shown with a cavity 122 in the seat back at the center seating position 118. The cavity 122 can be filled with any of a variety of seat modules such as the booster seat module 44 described previously, a child seat module 124, an armrest module 126 or other modules. The cavity 122 could be at any of the seating positions, not just the center seating position 118.

The child seat module 124 includes a frame 127 to which a pair of panels 128, 130 are pivotally attached through a hinge 132. The panels 128, 130 can be folded forward, forming a generally horizontal child seat. When the panels are folded forward, a child restraint system 136 comprising belts and buckles for use solely by a child is revealed in the recess. The frame 127 of the child seat module is attached to the seat back 114 with bolts 139 or other threaded fasteners extending through the holes 138 in the rear surface of the cavity 122. The bolts 139 are threaded into weld nuts 140 carried by the child seat module frame 127.

In a similar manner, the frame of the armrest module 126 is bolted to the seat back 114. The armrest module 126 contains a rotating panel 142 which can be rotated from an upright position in which it forms a portion of the front seating surface of the seat back, to a forwardly extending use position, in which it forms an armrest for a seat occupant positioned on either side of the armrest module 126.

The interchangeable modules enable the seat to be reconfigured to meet the changing needs of the vehicle owner. For example, a child seat module can be used for small children up to a given size. After that, the child seat module is replaced with a booster seat module. The booster seat module then enables the seat to be used by a child too large for the child seat but not large enough for the adult seat. Once the child no longer needs the booster seat, the booster seat module can be removed and replaced with the armrest module to provide enhanced seating comfort to those seated on either side of the armrest module. Other types of modules could be provided, as well.

It is to be understood that the invention is not limited to the exact construction illustrated and described above, but that various changes and modifications may be made without departing from the spirit and scope of the invention as defined in the following claims.

We claim:

1. A vehicle seat comprising:
   a lower seat cushion having an upper seating surface upon which an adult seat occupant sits and having a rear end;
   a seat back extending generally upwardly from said rear end of said lower seat cushion and having a forward facing seat back surface upon which a seat occupant rests, said seat back having a seat back panel which is movable between open and closed positions, said seat back panel forming a portion of said seat back surface against which a seat occupant rests when said seat back panel is in said closed position, and said seat back panel, when in said open position, revealing a recess in said seat back; and
   a child booster seat cushion having a stowed position within said recess in said seat back and being concealed therein by said seat back panel when said seat back panel is in said closed position, said child booster seat cushion being movable, when said seat back panel is in said open position, to a use position extending forward from said seat back and spaced vertically above said upper seating surface of said lower seat cushion whereby a child can sit upon said child booster seat cushion and be positioned at a higher elevation than if the child were seated upon said lower seat cushion;
   said seat back panel being movable back to said closed position after said child booster seat cushion is moved to said use position whereby said seat back panel forms a seat back surface for both child and adult seat occupants.

2. The vehicle seat of claim 1 wherein said child booster seat cushion is coupled to said seat back for rotation between said stowed and use positions.

3. The vehicle seat of claim 1 wherein said seat back panel is coupled to said seat back for rotation between said open and closed positions.

4. The vehicle seat of claim 1 further comprising a support leg attached to a distal end of said child booster seat cushion for engagement with said lower seat cushion to support said distal end of said child booster seat cushion above said lower seat cushion.

5. The vehicle seat of claim 4 wherein said support leg is pivotally attached to said child booster seat cushion for rotation between a position generally normal to said child booster seat cushion and a position generally parallel to said child booster seat cushion.

6. A vehicle seat comprising:
   a lower seat cushion having an upper seating surface upon which an adult seat occupant sits and having a rear end;
   a seat back extending generally upwardly from said rear end of said lower seat cushion having a face surface, said seat back having a cavity therein; and
   a replaceable booster seat module disposed in said cavity and mounted to said seat back in said cavity, said booster seat module having a module frame, a child booster seat cushion mounted to said module frame having a stowed position within said module and being movable to a use position extending forward from said seat back and above said upper seating surface of said lower seat cushion whereby a child can sit upon said child booster seat cushion and be positioned at a higher level than if seated upon said lower seat cushion, and said module also including a movable seat back panel which forms a seat back surface, said movable panel covering said child booster seat cushion when said child booster seat cushion is in said recess, said seat back panel forming said seat back surface for engagement by both adults seated on said lower seat cushion and children seated on said child booster seat cushion.

7. The vehicle seat of claim 6 wherein said booster seat module is mounted to said seat back by threaded fasteners to facilitate removal and replacement of said module.

8. The vehicle seat of claim 6 further comprising a child seat module having a child seat module frame, at least one panel rotatable mounted to said child seat module frame for movement between a stowed position and a use position in which said panel extends forwardly from said seat back above said lower seat cushion forming a child seat cushion whereby a child can sit upon said child seat cushion and a restraint system mounted to said frame for restraining a child seated upon said child seat cushion, said child seat module being adapted to be mounted to said seat back in said cavity when said booster seat module is removed.

9. The vehicle seat of claim 6 further comprising an armrest module having a panel movable between a stowed position in said module and a use position extending forward from said seat back and lying upon said lower seat cushion whereby a seat occupant seated upon said lower seat cushion adjacent said arm rest module can place his/her arm upon said panel, said armrest module being adapted to be mounted to said seat back in said cavity when said booster seat module is removed.

10. A vehicle seat comprising:
    a lower seat cushion having an upper seating surface upon which an adult seat occupant sits and having a rear end;
    a seat back extending generally upwardly from said rear end of said lower seat cushion and having a forward facing seat back surface upon which a seat occupant rests, said seat back having a cavity therein which interrupts said seat back surface;
    a movable seat back panel having a closed position overlying said cavity and forming said seat back surface over said cavity, said seat back panel being movable to an open position providing access into said cavity, said seat back panel having a wire frame attached for movement between said closed and open positions, a suspension mat drawn over said wire frame, a foam pad on said suspension mat and an upholstery cover over said wire frame, suspension mat and foam pad; and a child booster seat panel having a stowed position within said cavity and being movable to a use position extending forward from said seat back and above said upper seating surface of said lower seat cushion when said movable seat back panel is in said open position after which said seat back panel is returned to said closed position whereby a child can sit upon said child booster seat panel and be positioned at a higher level than if seated upon said lower seat cushion and rest against said movable seat back panel.

* * * * *